(12) United States Patent
Scheucher

(10) Patent No.: US 8,131,145 B2
(45) Date of Patent: Mar. 6, 2012

(54) LIGHTWEIGHT CORDLESS SECURITY CAMERA

(76) Inventor: Karl Frederick Scheucher, Waite Hill, OH (US)

( * ) Notice: Subject to any disclaimer, the term of this patent is extended or adjusted under 35 U.S.C. 154(b) by 642 days.

(21) Appl. No.: 12/181,300

(22) Filed: Jul. 28, 2008

(65) Prior Publication Data

US 2009/0086043 A1 Apr. 2, 2009

Related U.S. Application Data

(63) Continuation-in-part of application No. 11/672,957, filed on Feb. 8, 2007, and a continuation-in-part of application No. 11/673,551, filed on Feb. 9, 2007, now Pat. No. 7,838,142, and a continuation-in-part of application No. 11/864,996, filed on Sep. 29, 2007, which is a continuation-in-part of application No. 11/672,853, filed on Feb. 8, 2007.

(60) Provisional application No. 60/781,959, filed on Mar. 12, 2006, provisional application No. 60/771,771, filed on Feb. 9, 2006, provisional application No. 60/848,148, filed on Sep. 20, 2006, provisional application No. 60/952,240, filed on Jul. 26, 2007.

(51) Int. Cl.
*G03B 7/26* (2006.01)
*G03B 17/00* (2006.01)
*G03B 17/02* (2006.01)

(52) U.S. Cl. ........ 396/278; 396/277; 396/419; 396/427; 396/539

(58) Field of Classification Search .................. 396/277, 396/278, 422, 427, 539, 419; 348/372, 373
See application file for complete search history.

(56) References Cited

U.S. PATENT DOCUMENTS

| 3,178,669 | A | 4/1965 | Roberts |
| 3,391,374 | A | 7/1968 | Schleicher |
| 3,543,043 | A | 11/1970 | Dunn |
| 4,193,660 | A | 3/1980 | Jaconette |
| D276,495 | S | 11/1984 | Sylvia |
| 4,631,377 | A | 12/1986 | Imazeki et al. |
| 4,994,940 | A | 2/1991 | Thouvenin et al. |

(Continued)

FOREIGN PATENT DOCUMENTS

DE 2558456 A 6/1977

(Continued)

OTHER PUBLICATIONS

McDowellResearch, MRC-34, 2 Pages, Website, HTTP://WWW.MCDOWELLRESEARCH.COM/DATASHEET.PHP?ID=MRC-34.

(Continued)

*Primary Examiner* — Richard V Muralidar
(74) *Attorney, Agent, or Firm* — Woodling, Krost and Rust

(57) ABSTRACT

The present invention is a lightweight, cordless security camera comprising a lightweight stand or tripod, a video camera with pan, tilt, and zoom articulation and an audio microphone, a wireless networking interface enabling wireless access to the camera controls, video, and audio data streams, an antenna enabling transmission and reception of the aforementioned data via the aforementioned wireless networking interface, and a lightweight, battery power supply providing power to the video camera and wireless networking system. The lightweight, battery power supply includes one or more quickly coupled and uncoupled lightweight batteries which can be easily and quickly interchanged to provide continuous power to the security camera. This enables security forces such as police and military forces to safely and continuously monitor and surveil areas including crime scenes and combat theaters.

14 Claims, 14 Drawing Sheets

U.S. PATENT DOCUMENTS

| | | | |
|---|---|---|---|
| 5,187,423 | A | 2/1993 | Marton |
| 5,346,786 | A | 9/1994 | Hodgetts |
| 5,349,535 | A | 9/1994 | Gupta |
| 5,479,085 | A | 12/1995 | Honda et al. |
| 5,545,491 | A | 8/1996 | Farley |
| 5,563,493 | A | 10/1996 | Matsuda et al. |
| 5,631,536 | A | 5/1997 | Tseng |
| 5,694,019 | A | 12/1997 | Uchida et al. |
| 5,696,367 | A | 12/1997 | Keith |
| 5,711,648 | A | 1/1998 | Hammerslag |
| 5,773,977 | A | 6/1998 | Dougherty |
| 5,792,573 | A | 8/1998 | Pitzen et al. |
| 5,806,948 | A | 9/1998 | Rowan et al. |
| 5,847,537 | A | 12/1998 | Parmley |
| 5,951,229 | A | 9/1999 | Hammerslag |
| 5,959,368 | A | 9/1999 | Kubo et al. |
| 5,998,963 | A | 12/1999 | Aarseth |
| 6,018,227 | A | 1/2000 | Kumar et al. |
| 6,085,836 | A | 7/2000 | Burris et al. |
| 6,087,806 | A | 7/2000 | Fujioka |
| 6,094,028 | A | 7/2000 | Gu |
| 6,140,798 | A | 10/2000 | Krieger |
| 6,150,823 | A | 11/2000 | Takahashi et al. |
| 6,154,006 | A | 11/2000 | Hatanaka |
| 6,157,162 | A | 12/2000 | Hayashi |
| 6,350,149 | B1 | 2/2002 | Nakane |
| 6,361,897 | B1 | 3/2002 | Snyder |
| 6,445,158 | B1 | 9/2002 | Bertness et al. |
| 6,465,986 | B1 | 10/2002 | Haba |
| 6,498,454 | B1 | 12/2002 | Pinlam et al. |
| 6,631,775 | B1 | 10/2003 | Chaney |
| D483,012 | S | 12/2003 | Hsu |
| 6,773,849 | B2 | 8/2004 | Itoh et al. |
| 6,788,025 | B2 | 9/2004 | Bertness et al. |
| 6,841,293 | B1 | 1/2005 | Dreulle et al. |
| 6,940,254 | B2 | 9/2005 | Nagamine |
| D511,744 | S | 11/2005 | Hsu et al. |
| D512,373 | S | 12/2005 | Tsai et al. |
| D514,060 | S | 1/2006 | Wong et al. |
| D516,020 | S | 2/2006 | Wong et al. |
| D524,728 | S | 7/2006 | Watson |
| 7,157,882 | B2 | 1/2007 | Johnson et al. |
| 7,157,883 | B2 | 1/2007 | Johnson et al. |
| 7,164,257 | B2 | 1/2007 | Johnson et al. |
| D537,408 | S | 2/2007 | Aglassinger |
| 7,176,654 | B2 | 2/2007 | Meyer et al. |
| 7,180,547 | B2 * | 2/2007 | Wei ............................... 348/375 |
| 7,193,392 | B2 | 3/2007 | King et al. |
| D545,759 | S | 7/2007 | Ino et al. |
| 7,245,108 | B2 | 7/2007 | Chertok et al. |
| 7,253,585 | B2 | 8/2007 | Johnson et al. |
| 7,256,516 | B2 | 8/2007 | Buchanan |
| 7,262,580 | B2 | 8/2007 | Meyer et al. |
| D557,203 | S | 12/2007 | Grunow et al. |
| 7,313,469 | B2 | 12/2007 | Wobben |
| D559,175 | S | 1/2008 | Houghton |
| 7,321,219 | B2 | 1/2008 | Meyer et al. |
| 7,323,847 | B2 | 1/2008 | Meyer et al. |
| D562,228 | S | 2/2008 | Okada et al. |
| 7,327,122 | B2 | 2/2008 | Kamenoff |
| 7,342,381 | B2 | 3/2008 | Johnson et al. |
| D568,239 | S | 5/2008 | Okada et al. |
| 7,378,818 | B2 | 5/2008 | Fowler et al. |
| 7,492,124 | B2 | 2/2009 | Johnson et al. |
| 7,504,804 | B2 | 3/2009 | Johnson et al. |
| 7,507,500 | B2 | 3/2009 | Donnelly et al. |
| 7,508,167 | B2 | 3/2009 | Meyer et al. |
| 7,554,290 | B2 | 6/2009 | Johnson et al. |
| 7,557,535 | B2 | 7/2009 | Johnson et al. |
| D601,088 | S | 9/2009 | Scheucher |
| 7,589,500 | B2 | 9/2009 | Johnson et al. |
| 7,609,027 | B2 | 10/2009 | Zick et al. |
| 7,724,303 | B2 * | 5/2010 | DeSorbo ....................... 348/373 |
| 7,769,867 | B2 * | 8/2010 | Fukuda ...................... 348/231.9 |
| 7,899,320 | B2 * | 3/2011 | Lindsay ........................ 396/278 |
| 2001/0020838 | A1 | 9/2001 | Malackowski |
| 2002/0025471 | A1 | 2/2002 | Valdez |
| 2002/0096323 | A1 | 7/2002 | Burris et al. |
| 2002/0152476 | A1 | 10/2002 | Anderson et al. |
| 2003/0118339 | A1 * | 6/2003 | Yu et al. ......................... 396/428 |
| 2003/0143455 | A1 | 7/2003 | Partington et al. |
| 2003/0193588 | A1 * | 10/2003 | Yuen et al. .................... 348/275 |
| 2004/0160214 | A1 | 8/2004 | Blair et al. |
| 2004/0201362 | A1 | 10/2004 | Borrego Bel et al. |
| 2004/0257464 | A1 * | 12/2004 | Pandit et al. .................. 348/373 |
| 2005/0017690 | A1 | 1/2005 | Kamenoff |
| 2006/0012342 | A1 | 1/2006 | Kamenoff |
| 2006/0028167 | A1 | 2/2006 | Czubay et al. |
| 2006/0267547 | A1 | 11/2006 | Godovich |
| 2007/0182158 | A1 | 8/2007 | Cerney et al. |
| 2007/0184339 | A1 | 8/2007 | Scheucher |
| 2007/0188130 | A1 | 8/2007 | Scheucher |
| 2007/0188137 | A1 | 8/2007 | Scheucher |
| 2008/0008928 | A1 | 1/2008 | Partin et al. |
| 2008/0008933 | A1 | 1/2008 | Lampe-Onnerud et al. |
| 2008/0053716 | A1 | 3/2008 | Scheucher |
| 2008/0185993 | A1 | 8/2008 | Johnson et al. |
| 2008/0213652 | A1 | 9/2008 | Scheucher |
| 2009/0029193 | A1 | 1/2009 | Onnerud et al. |
| 2009/0086043 | A1 | 4/2009 | Scheucher |
| 2009/0087729 | A1 | 4/2009 | Johnson et al. |
| 2009/0153101 | A1 | 6/2009 | Meyer et al. |
| 2009/0181296 | A1 | 7/2009 | Lampe-Onnerud et al. |
| 2009/0195216 | A1 | 8/2009 | Johnson et al. |
| 2009/0197152 | A1 | 8/2009 | Johnson et al. |

FOREIGN PATENT DOCUMENTS

| | | |
|---|---|---|
| EP | 662725 A1 | 12/1995 |
| JP | 043544181 A | 12/1992 |
| JP | 07059124 A | 3/1995 |
| WO | 2007/092955 A2 | 8/2007 |
| WO | 2007/092955 A3 | 6/2008 |
| WO | 2009009176 A2 | 1/2009 |
| WO | 2009009176 ISR A3 | 3/2009 |

OTHER PUBLICATIONS

McDowellResearch, Briefcase Power System, 1 Page, Website, HTTP://WWW.MCDOWELLRESEARCH.COM/subcategory.php?ID=21.

Automated Business Power, Uninterruptible Power Supply for Javelin Clu, 1 Page, Website, http://www.abpco.com/Uninterruptible_Power_Supply_JAVELIN_CLU.shtml.

Automated Business Power, Uninterruptible Power Transceiver Power Unit Applications, 2 Pages Website, http://www.abpco.com/Uninterruptible_Power_Supply_Transceiver_Battery_Eliminator_Eliminator_App.shtml.

Automated Business Power, Uninterruptible Power Supply Transceiver Battery Eliminator Applications, 2 Pages Website, HTTP://WWW.ABPCO.COM/UNINTERRUPTIBLE_Power_SUPPLY_TRANSCEIVER_BATTERY_ELIMINATOR_APP.SHTML.

Motorola, Inc. WMC7300, 2006, pp. 1-2, Maitland, Florida 32794-8133, http://www.motorola.com/mesh/pdf/data_sheet_wmc7300.pdf.

Motorola, Inc. IAP 7300, 2006, pp. 1-2, www.motorola.com/mesh, Maitland, Florida 32794-8133, http://www.motorola.com/mesh/pdf/data_sheet_iap7300.pdf.

International Rectifier, IRF7240 HEXFET Power MOSFET, Mar. 6, 2001, IR World Headquarters: 233 Kansas St., El Segundo, California 90245, www.irf.com.

Diodes Incorporated, PDS1040CTL, Diodes Incorporated. pp. 1-3, www.diodes.com.

Panasonic, Multilayer Chip NTC Thermistors, pp. 1-4.

Kerchner, George A. "Battery Power Online" 2001, Webcom Communications Corp. http://www.batterypoweronline.com/july02LilonRegulations.htm.

PowerGate LLC. "Cosel 150 Watt Enclosed Single Output Switcher" pp. 1-2, PowerGate LLC 3000 Coronado Dr. Santa Clara, CA 95054.

Acon, Inc., "MH Series, 100-300W" Oct. 21, 2004, pp. 1-17, www.aconinc.com.

CD Media Corporation, "150W DC to AC Power Inverter" 1999-2005, 1 page, http://www.hobbyracer.com/kv-150htm.

National Semiconductor, "LM2936-3.3 Ultra-Low Quiescent Current 3.3V Regulator", Jun. 2002, pp. 1-10, DS101324, National Semiconductor Corporation, WWW.NATIONAL.COM.

Texas Instruments, "MSP430X15X", SLAS368B, Mar. 2004, pp. 1-64, Texas Instruments, Dallas, Texas.

Transistor Devices, Inc. "2 KW Scaleable LI-Ion AC UPS", Website http://www.tdipower.com/360/ups/ups_360.html, 1 page.

Nexergy, "Portable Power Solutions: Designing the Optimal Portable Power System" pp. 1-8, http://www.nexergy.com/pdf/Designing_Optimal_PPwr.pdf.

Nass, Richard, "Extending Battery Life" EE Times, Jan. 6, 1997, pp. 1-4, http://www.nexergy.com/extending-battery-life.htm.

Motorola, Inc. MWR7300, 2006, pp. 1-2, Motorola Maitland, Florida 32794-8133,http://www.motorola.com/mesh/pdf/data_sheet_mwr7300.pdf.

Motorola, Inc. VMM7300, 2006, pp. 1-2, Motorola Maitland, Florida 32794-8133,http://www.motorola.com/mesh/pdf/data_sheet_vmm7300.pdf.

U.S. Appl. No. 60/951,669; F/D: Jul. 24, 2007; Inventor Name: Toby Thomas.

U.S. Appl. No. 60/909,873; F/D: Apr. 3, 2007; Inventor Name: David L. Hoelscher, 28 Pages.

U.S. Appl. No. 29/280,875; F/D: Jun. 8, 2007; Inventor Name: Karl Scheucher.

U.S. Appl. No. 60/952,240; F/D: Jul. 26, 2007; Inventor Name: Karl Scheucher.

U.S. Appl. No. 60/911,564; F/D: Apr. 13, 2007; Inventor Name: Karl Scheucher.

U.S. Appl. No. 29/266,852; F/D: Sep. 29, 2006; Inventor Name: Karl Scheucher.

U.S. Appl. No. 60/771,771; F/D: Feb. 9, 2006; Inventor Name: Karl Scheucher.

U.S. Appl. No. 60/781,959; F/D: Mar. 12, 2006; Inventor Name: Karl Scheucher.

U.S. Appl. No. 60/855,958; F/D: Nov. 1, 2006; Inventor Name: Karl Scheucher.

U.S. Appl. No. 60/857,079; F/D: Nov. 6, 2006; Inventor Name: Karl Scheucher.

Watson, R.L. et al; "Refueling Infrastructure for an All-Electric Car Fleet"; Transport and Road Research Laboratory; Research Report 66; 1986; 34 Pages; ISSN 0266-5247; Hobbs the Printers of Southampton, UK.

Meissner, E. et al. "Battery Monitoring and Electrical Energy Management Precondition for future vehicle electric power systems"; Journal of Power Sources; 2003; pp. 79-98; 116, Elsevier Science B.V., Amsterdam 1043, NX.

Santhanagopalan, S. et al. "Online Estimation of the state of charge of a lithium ion cell". Journal of Power Sources; Jun. 19, 2006; pp. 1346-1355; 161; Elsevier Science B.V., Amsterdam 1043, NX.

Plett, G. L. "Extended Kalman filtering for battery management systems of LiPB-based HEV batter packs". Journal of Power Sources; Jun. 9, 2004; pp. 252-292; Elsevier Science B.V., Amsterdam 1043, NX.

U.S. Appl. No. 60/848,148; F/D: Sep. 29, 2006; Inventor Name: Karl Scheucher.

\* cited by examiner

LIGHTWEIGHT CORDLESS SECURITY CAMERA

This application is a continuation in part of U.S. patent application Ser. No. 11/672,957, filed Feb. 8, 2007; Ser. No. 11/673,551, filed Feb. 9, 2007 now U.S. Pat. No. 7,838,142; and, Ser. No. 11/864,996, filed Sep. 29, 2007. U.S. patent application Ser. No. 11/672,957, filed Feb. 8, 2007; Ser. No. 11/673,551, filed Feb. 9, 2007 claim the benefit of provisional patent application Ser. No. 60/781,959 filed Mar. 12, 2006 and provisional patent application Ser. No. 60/771,771 filed Feb. 9, 2006. U.S. patent application Ser. No. 11/864,996 is a continuation in part of application Ser. No. 11/672,853 which in turn claims priority from provisional application Ser. Nos. 60/781,959 filed Mar. 12, 2006, and 60/771,771 filed Feb. 9, 2006. U.S. patent application Ser. No. 11/864,996 claims priority to provisional patent application Ser. No. 60/848,148 filed Sep. 20, 2006 Additionally, the instant patent application claims priority to provisional U.S. Patent Application Ser. No. 60/952,240 filed Jul. 26, 2007.

FIELD OF THE INVENTION

The invention is in the field of lightweight cordless security cameras.

BACKGROUND OF THE INVENTION

Police and military forces have the need to monitor and surveil crime scenes and combat zones. Further, disaster relief, fire and rescue forces have the need to monitor and surveil disasters so as to communicate information to coordinating government officials and hospital doctors, nurses and staff to prepare to handle the emergency.

Therefore, it is highly desirable to have lightweight cordless security cameras on the ground which can be placed in strategic locations to facilitate these important public functions.

SUMMARY OF THE INVENTION

The present invention is a lightweight, cordless security camera comprising a lightweight stand or tripod, a video camera with pan, tilt, and zoom articulation and an audio microphone, a wireless networking interface enabling wireless access to the camera controls, video, and audio data streams, an antenna enabling transmission and reception of the aforementioned data via the aforementioned wireless networking interface, and a lightweight, battery power supply providing power to the video camera and wireless networking system. The lightweight, battery power supply includes one or more quickly coupled and uncoupled lightweight batteries which can be easily and quickly interchanged to provide continuous power to the security camera. This enables security forces such as police and military forces to safely and continuously monitor and surveil areas including crime scenes and combat theaters.

The center post of the tripod stand is hollow. The antenna is located safely within this hollow center post. The camera is mounted atop this hollow post. The wireless networking interface is a printed circuit card module plugged into an available socket in the camera. The battery power supply is mounted around this center post, below the camera. The center post with the operative components of the system including camera, antenna, wireless networking card, and battery power supply may be slid up and out of the tripod base as a contiguous unit. This post may alternatively be mounted as a stake driven into the ground, lashed or taped to another structure such as a tree, building or fence. Other structure may be used for mounting.

The battery subsystem includes a rain cover made of water repellant fabric with a zipper to facilitate easy access to and exchange of the battery packs beneath it. The power system includes a carousel style carrier that mounts concentric to the center stand post. This carrier has docking locations for several quick-disconnect style battery packs and also a docking location for a power conversion and control module. The battery packs are typically arranged in an electrically parallel fashion. The camera will operate when any single battery pack is installed. Additional battery packs may be installed to prolong operating time. Packs may also be hot-swapped, a discharged pack being replaced by a charged pack, without interrupting camera operation.

The power conversion and control module includes power-conditioning circuitry used to condition the battery power for optimum use by the camera. Adjustments to the power conversion circuit allow the battery packs of any manufacturer to be utilized with any camera. The power conversion and control module may also include a micro-controller that monitors battery and power supply status. Certain video cameras include auxiliary data inputs used for sensors such as motion detectors or general-purpose inputs. When so equipped, the video camera may receive information regarding power supply and battery status from the aforementioned micro-controller. Information about how much charge is available in the battery system then becomes available to the user over the wireless network.

Low weight and quick setup are key features of the present invention. A typical unit complete with 225 watt hours of battery energy weighs less than 20 lbs. and may be deployed in less than 30 seconds. Deployment consists of extending the base of the tripod stand, and plugging a battery pack onto a quick connect site on the carousel. Operation is now underway with video, audio, and control available via a remote computer over the wireless network. Additional battery packs may be plugged in if desired. See FIGS. 1-14.

My technology as expressed in my pending patent application Ser. Nos. 60/848,148; 60/855,958; 11/672,853; 11/672,957; 11/673,551; 11/864,996 and PCT/US07/61928 is incorporated by reference herein just the same as written herein.

Accordingly, it is an object of the invention to provide an intelligent modular power supply for use in connection with a portable camera which is lightweight, contains substantial power and can be operated for extended periods of time.

Figure 1:
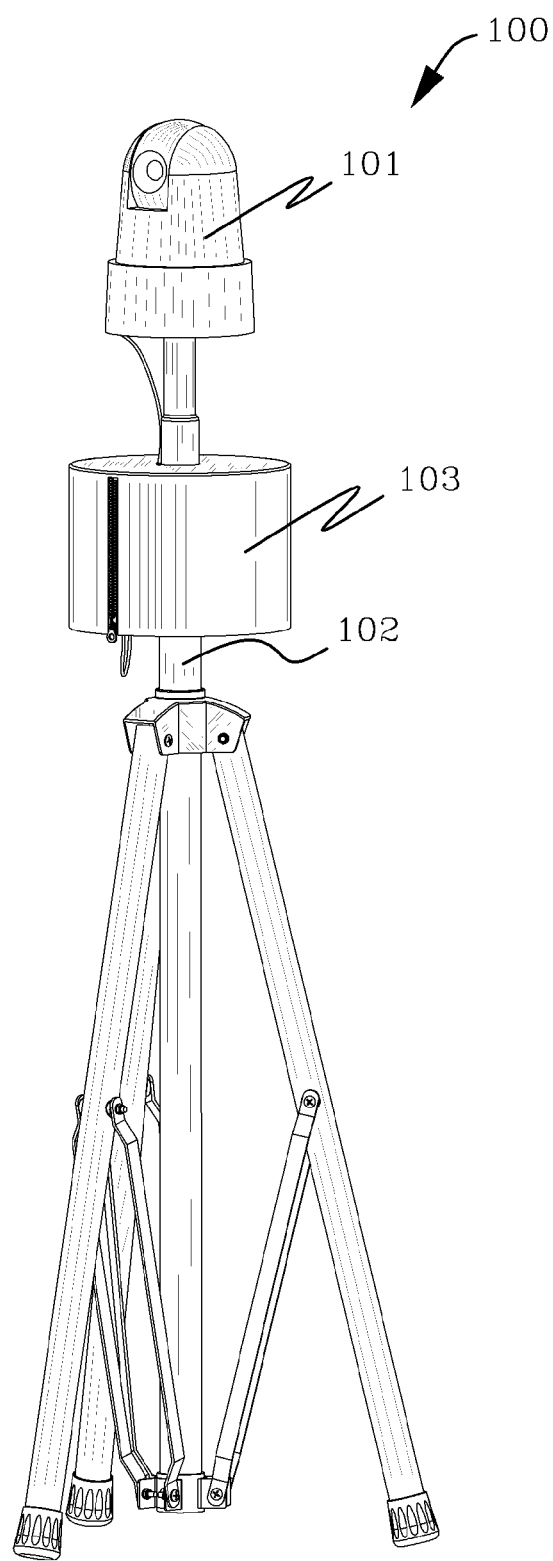
FIG. 1 is a generally front view of the camera mounted on the post with the replaceable batteries behind a shroud or skirt.

The drawing views will be best understood when reference is made to the Description of the Invention and Claims which follow hereinbelow.

DESCRIPTION OF THE INVENTION

Figure 2:
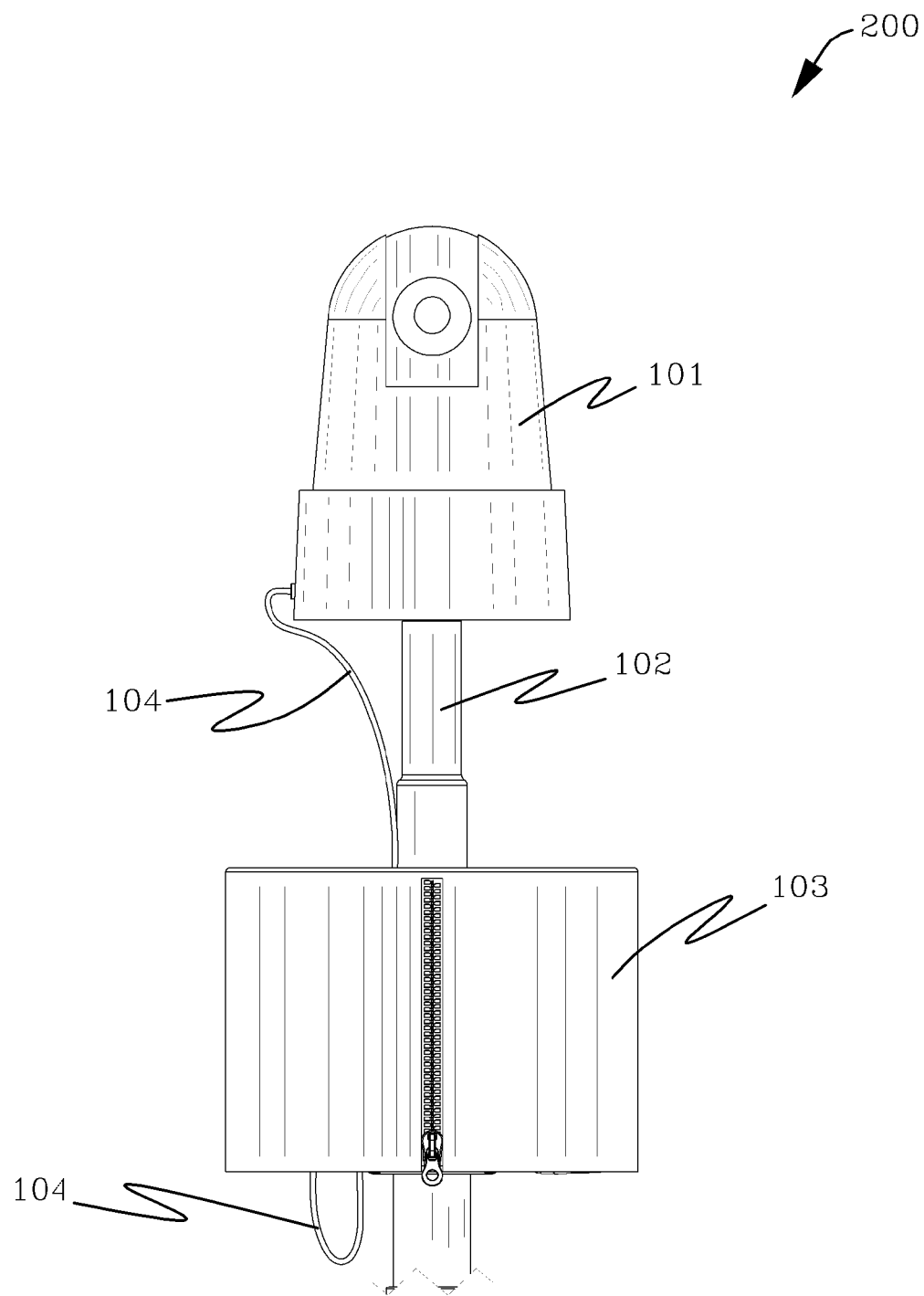
FIG. 2 is a close-up view of the camera mounted on the post as set forth in FIG. 1.
Figure 3:
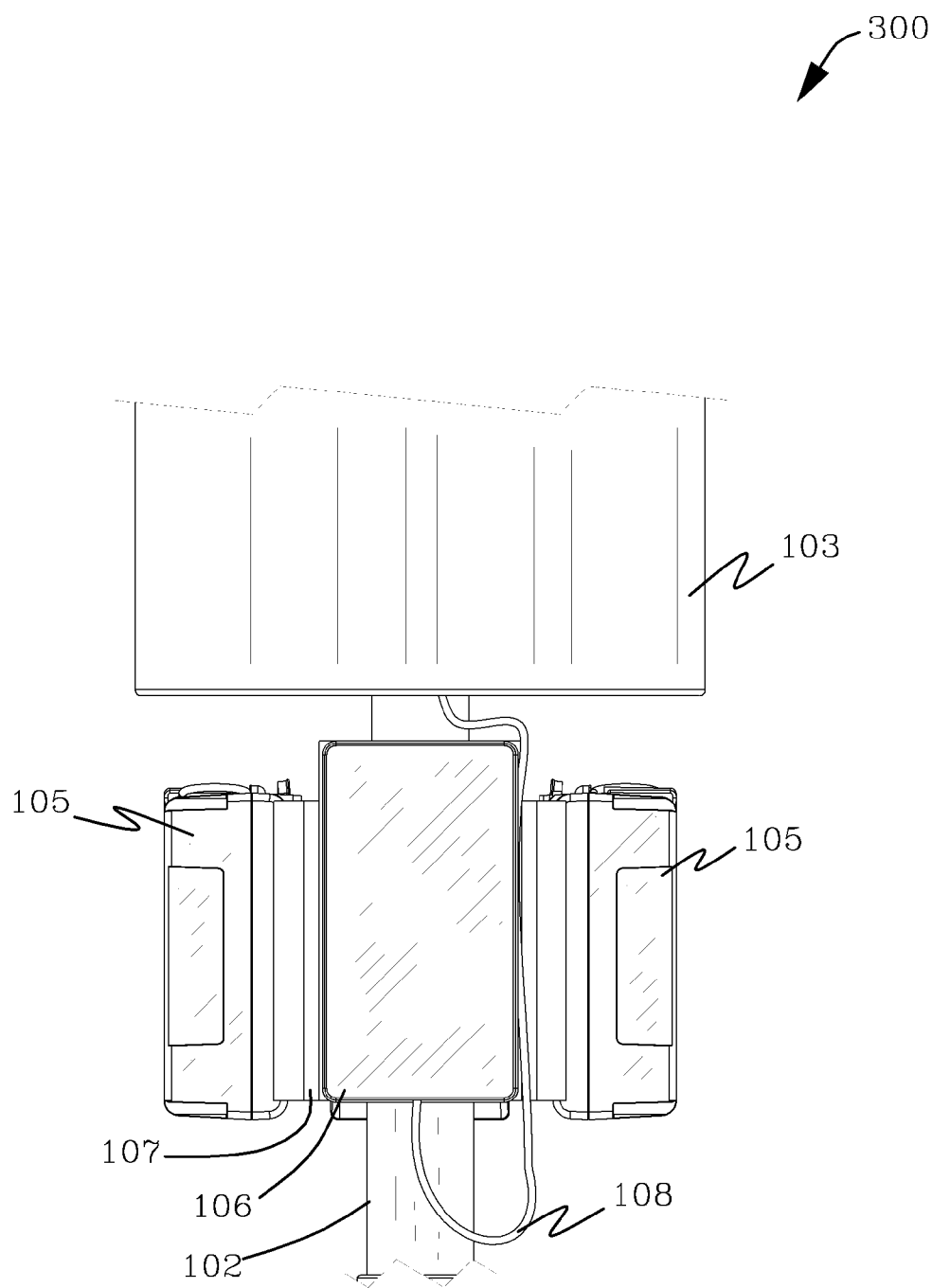
FIG. 3 is a view with the shroud or skirt lifted exposing the replaceable batteries and a power converter unit.

FIG. 1 is a generally front view 100 of the camera 101 mounted on the post 102 with the replaceable batteries behind a shroud or skirt 103. FIG. 2 is a close-up view 200 of the camera 101 mounted on the post 102 as set forth in FIG. 1. Power and/or communication cable 104 is illustrated in FIG. 2. FIG. 3 is a view 300 with the shroud or skirt 103 lifted exposing the replaceable batteries 105 and a power converter unit. 106. Also illustrated in FIG. 3 is a mounting block 107 which is mechanically mounted to the post with set screws or the like. Mount 107 is easily slid up and down the post so that the mount can be located vertically at any point along the shaft. Multiple mounting blocks are contemplated so as to increase the amount of energy which may be delivered to the camera for its operation and to enable communication therewith. Reference numeral 108 represents a power communication cable between the power converter 106 and the camera 101. Connections between the power conversion and control unit 106 and the batteries 105 are made by wiring routed within the mounting block 107. It will be noted in FIG. 3 that Lithium ion batteries may be used to supply the camera as the have favorable energy and weight characteristics.

Four (4) quick connect docking positions are shown located at 90 degree increments around the center post in the embodiment of FIG. 3, one position each to the right, left, and front side, and a fourth position to the rear which is not visible in this view. A lesser or greater number of docking positions are contemplated, such as three (3) or five (5) positions located at 120 degree or 72 degree increments around the center post respectively.

The embodiment shown in FIG. 3 depicts three (3) battery packs and one (1) power conversion and control unit, all of the quick disconnect variety. This invention further considers a different mix of battery packs and power conversion and control modules such as two (2) battery packs and two (2) power conversion and control modules in the case of the four (4) position mounting block, or one (1) battery pack and four (4) power conversion and control modules in the case of a five (5) position mounting block.

The power conversion and control module depicted in FIG. 3 conditions the battery power for use by the camera and other electronics being powered. This type of module is referred to as a power output module since it receives power from an internal power bus (the battery bus in this case), conditions this received power, and outputs the power so conditioned to some external load such as the camera. The instant invention utilizes any type of power output module including types providing DC output power of any voltage as well as those providing AC output power of any voltage or frequency.

My invention also contemplates the use of modules referred to as power input modules. Power input modules receive input power from an external source such as line or mains power, power from an external battery such as an automotive or other type vehicle, aircraft, or marine battery or DC electrical system, power from an AC or DC generator such as those powered by internal combustion engines, wind, or other energy sources, power from solar panels, power from fuel cells or any other available power source. The power received by the module is conditioned to be compatible with the aforementioned internal battery bus. The conditioned power is then switchably connected to the internal battery bus where it may be utilized to recharge the batteries and/or to power one or more of the aforementioned power output devices which may in turn ultimately power external devices such as a camera.

Summarizing the previous discussion, the present invention may be implemented to use one or more mounting blocks, each mounting block providing one or more quick coupling connectors, each quick coupling connector coupling with nothing, one of many types of batteries or energy source modules, one of many types of power output modules, or one of many types of power input modules.

Figure 4:
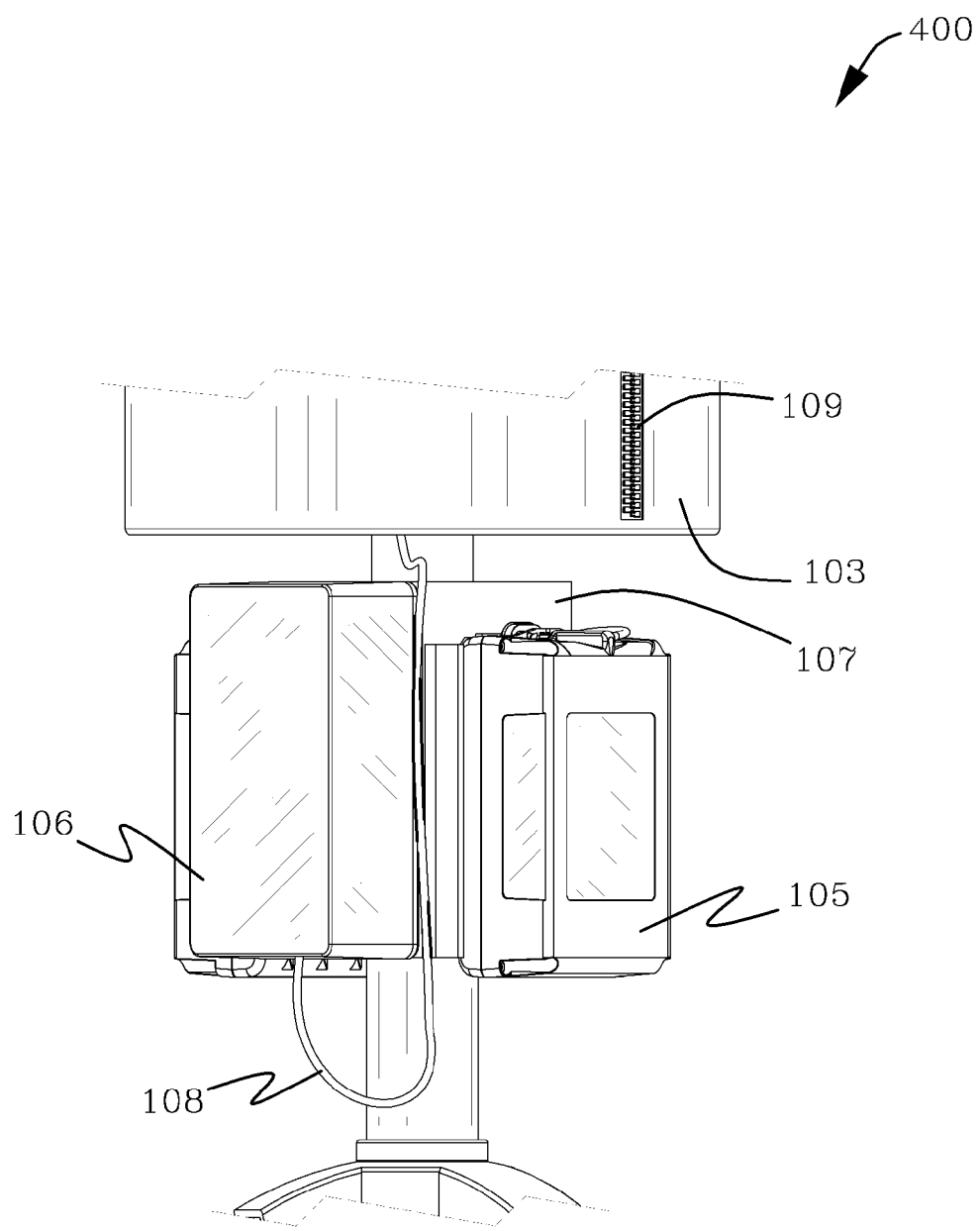
FIG. 4 is another view similar to FIG. 3 from another perspective.
Figure 5:
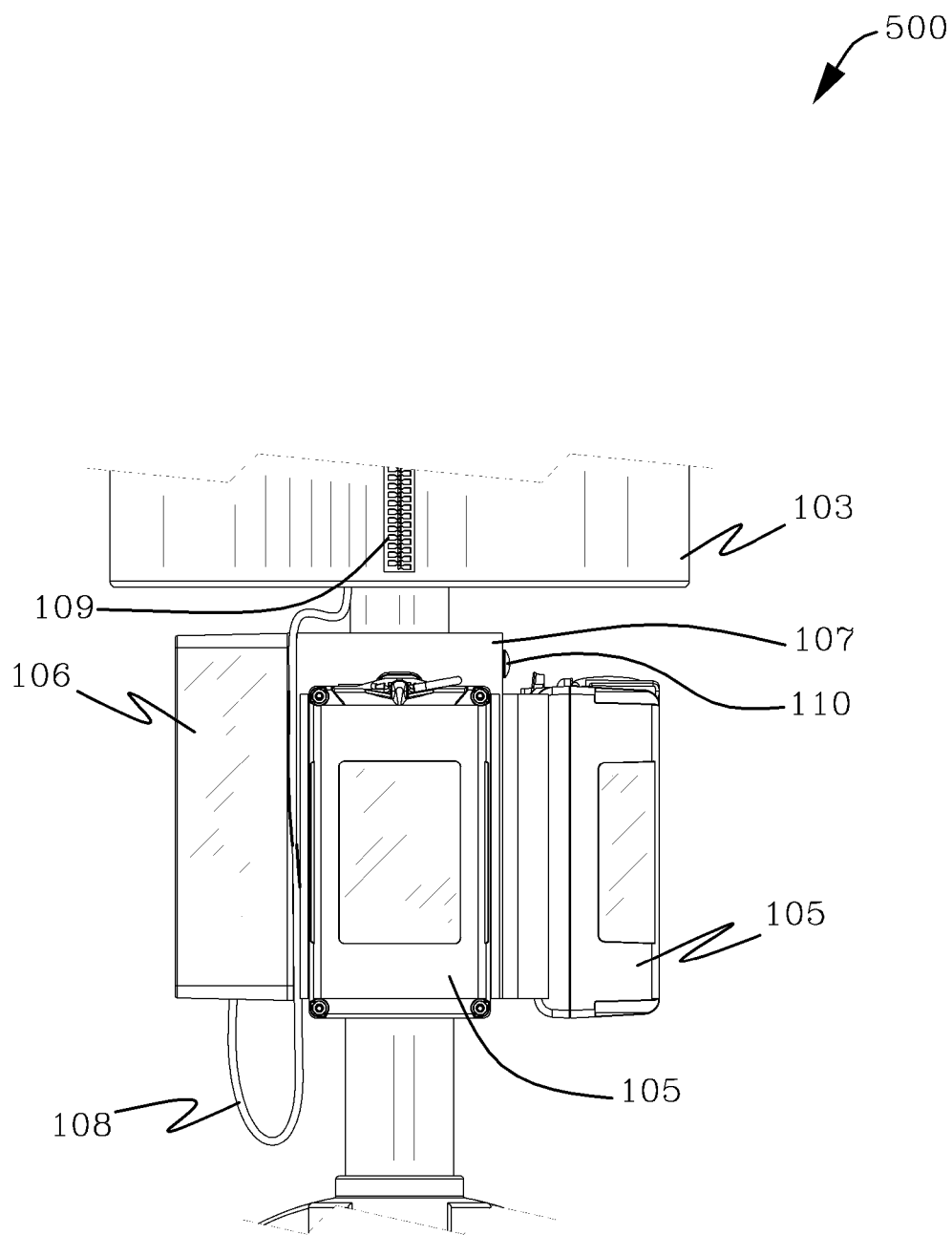
FIG. 5 is a side view with the shroud or skirt lifted exposing the replaceable batteries and a power converter unit.
Figure 6:
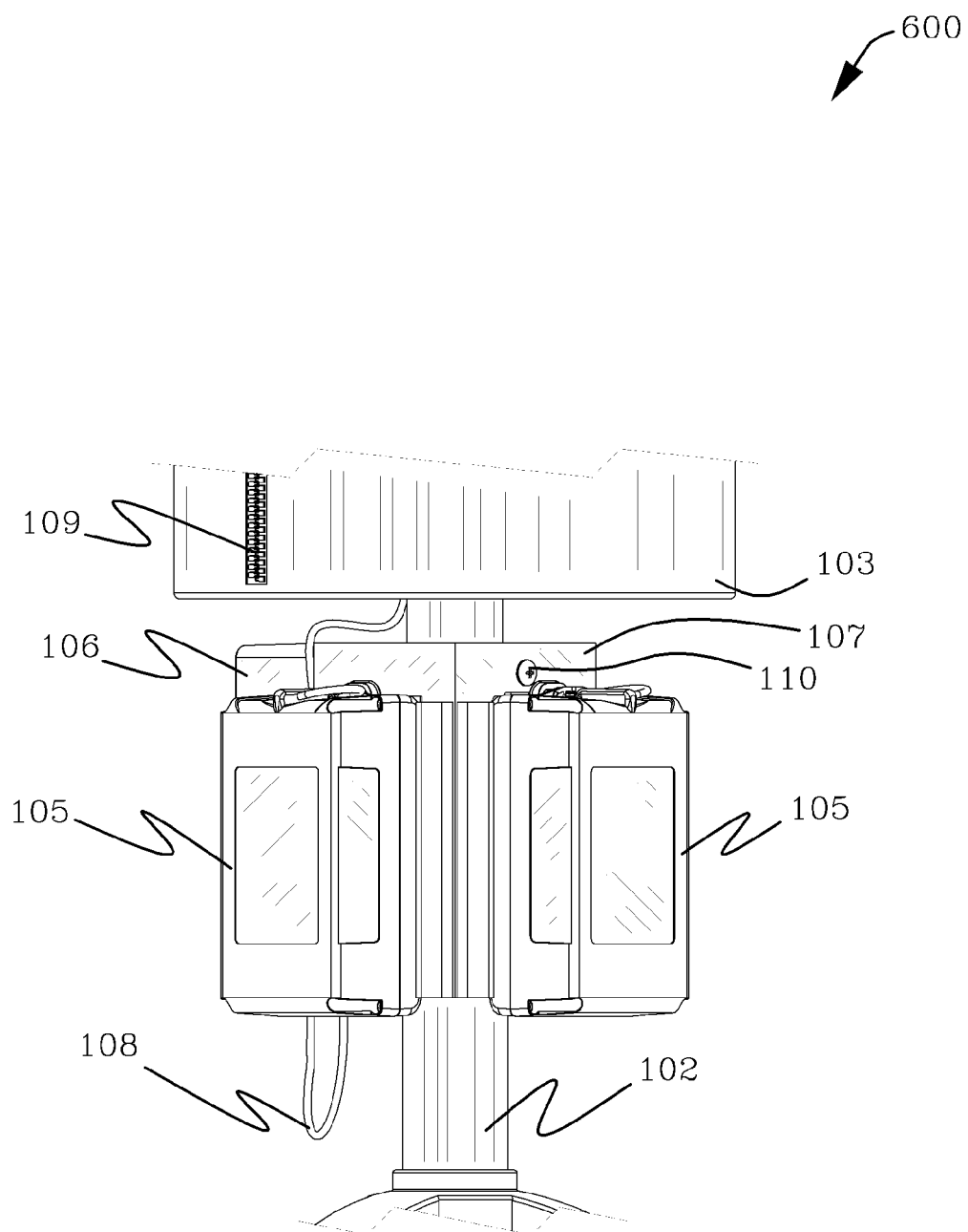
FIG. 6 is another view with the shroud or skirt lifted exposing the replaceable batteries and the power converter unit and the mount to which they are easily and quickly connected and disconnected.

FIG. 4 is another view 400 similar to FIG. 3 from another perspective. FIG. 4 illustrates a zipper 109. FIG. 5 is a side view 500 with the shroud or skirt 103 lifted exposing the replaceable batteries 105 and a power converter unit 106. FIG. 6 is another view 600 with the shroud or skirt lifted exposing the replaceable batteries and the power converter unit and the mount to which they are easily and quickly connected and disconnected. FIG. 6 also illustrates one of the set screws 110 used to affix the mounting block 107 to the post. 102.

Figure 7:
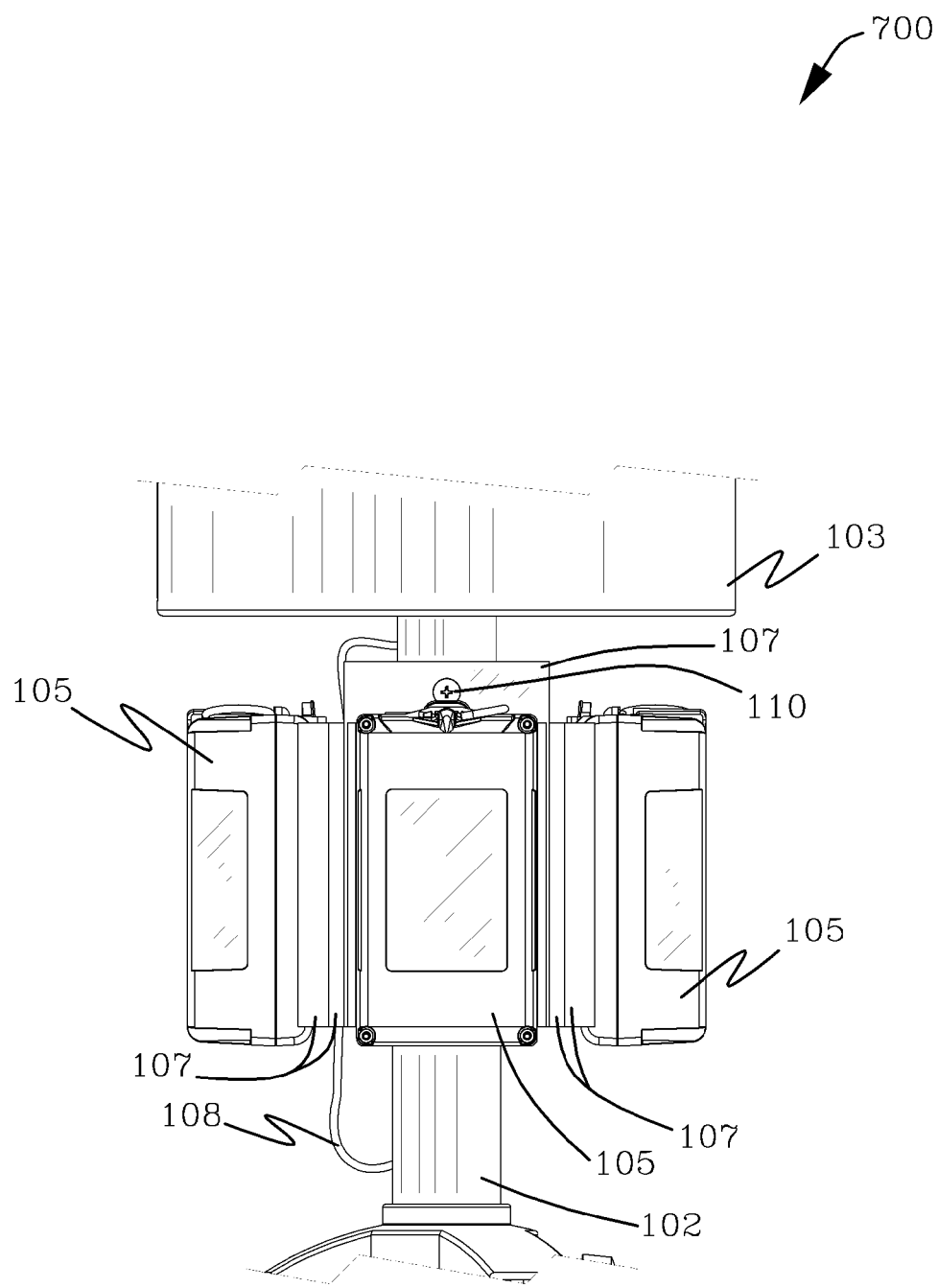
FIG. 7 is a rear view with the shroud or skirt lifted enabling the batteries to be viewed.
Figure 8:
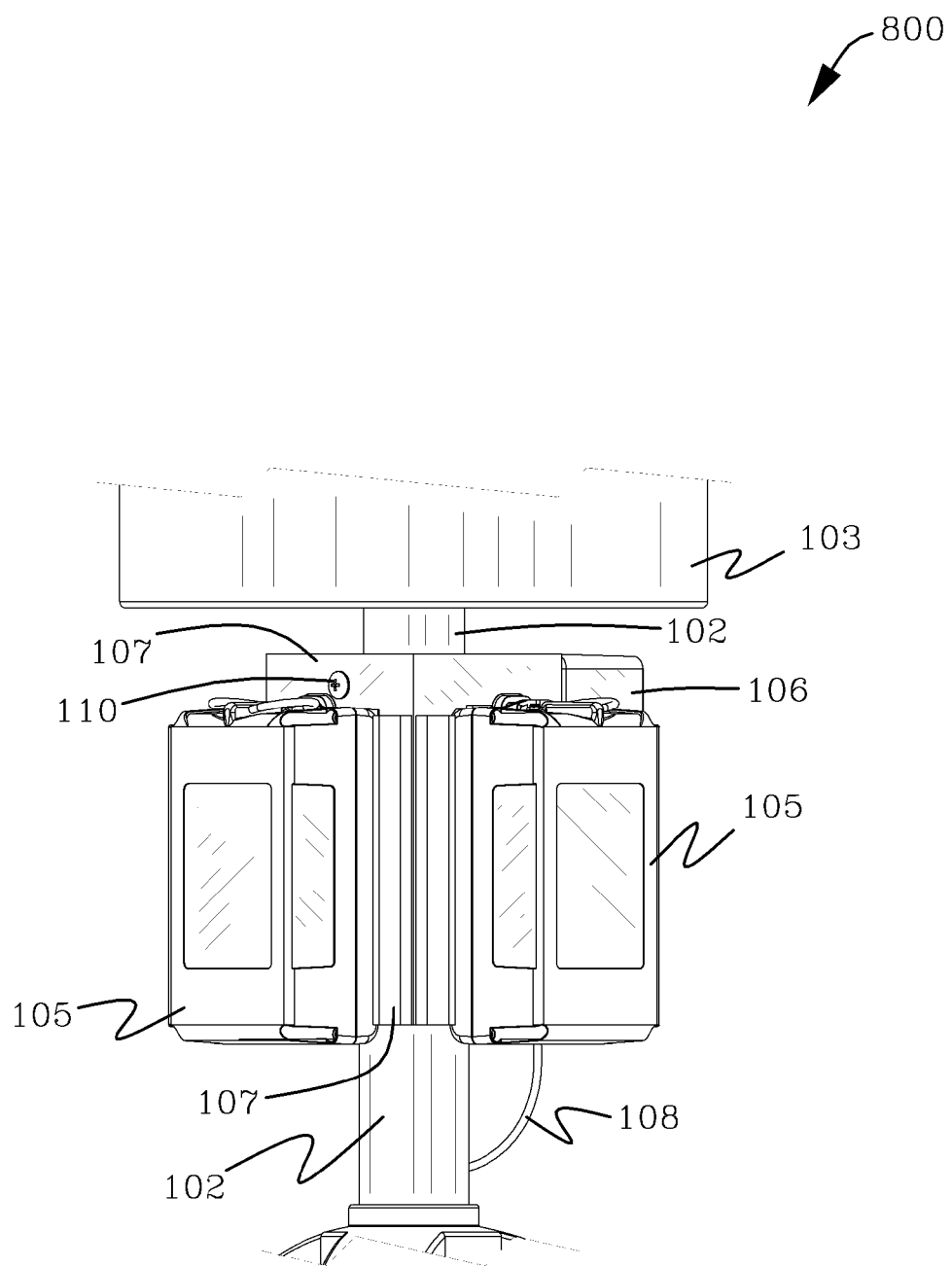
FIG. 8 is another perspective view of the shroud or skirt lifted enabling the batteries to be viewed.
Figure 9:
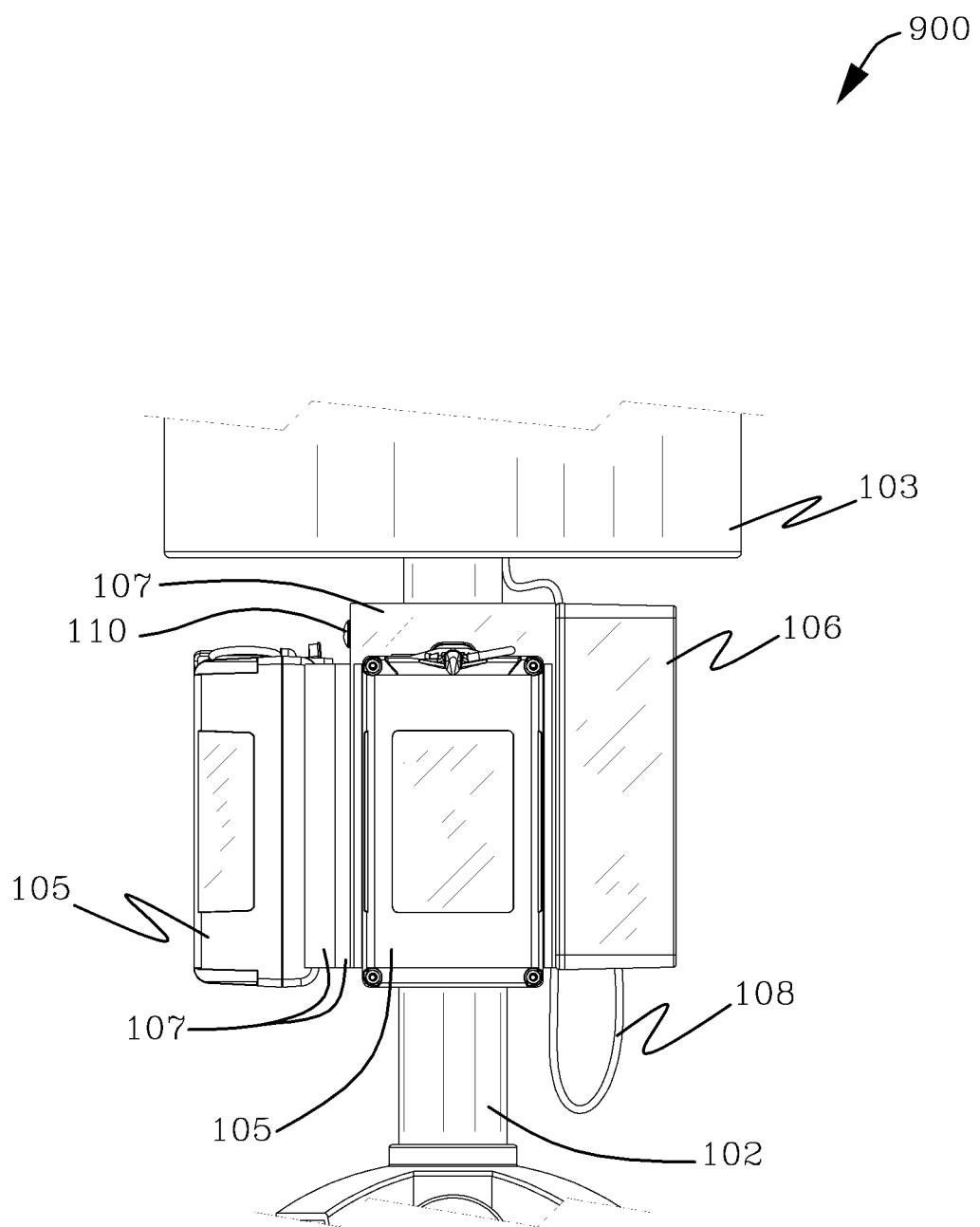
FIG. 9 is a right side view of the shroud or skirt lifted enabling the batteries to viewed.

FIG. 7 is a rear view 700 with the shroud or skirt lifted enabling the batteries to be viewed. FIG. 8 is another perspective view 800 of the shroud or skirt lifted enabling the batteries to be viewed. FIG. 9 is a right side view 900 of the shroud or skirt lifted enabling the batteries to viewed.

Figure 10:
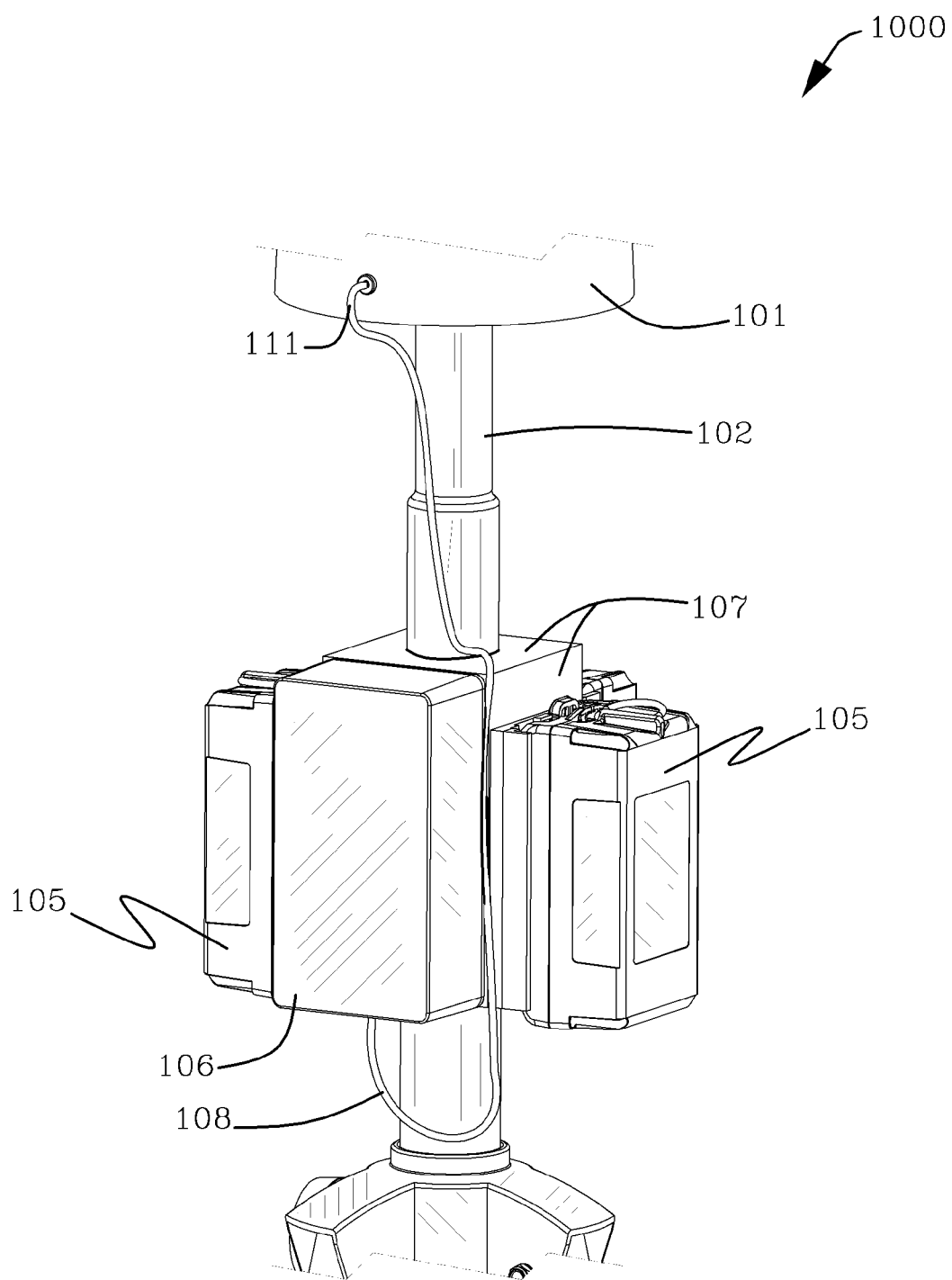
FIG. 10 is a top perspective view of the batteries and the converter affixed to the mount which in turn is fastened to the post.
Figure 11:
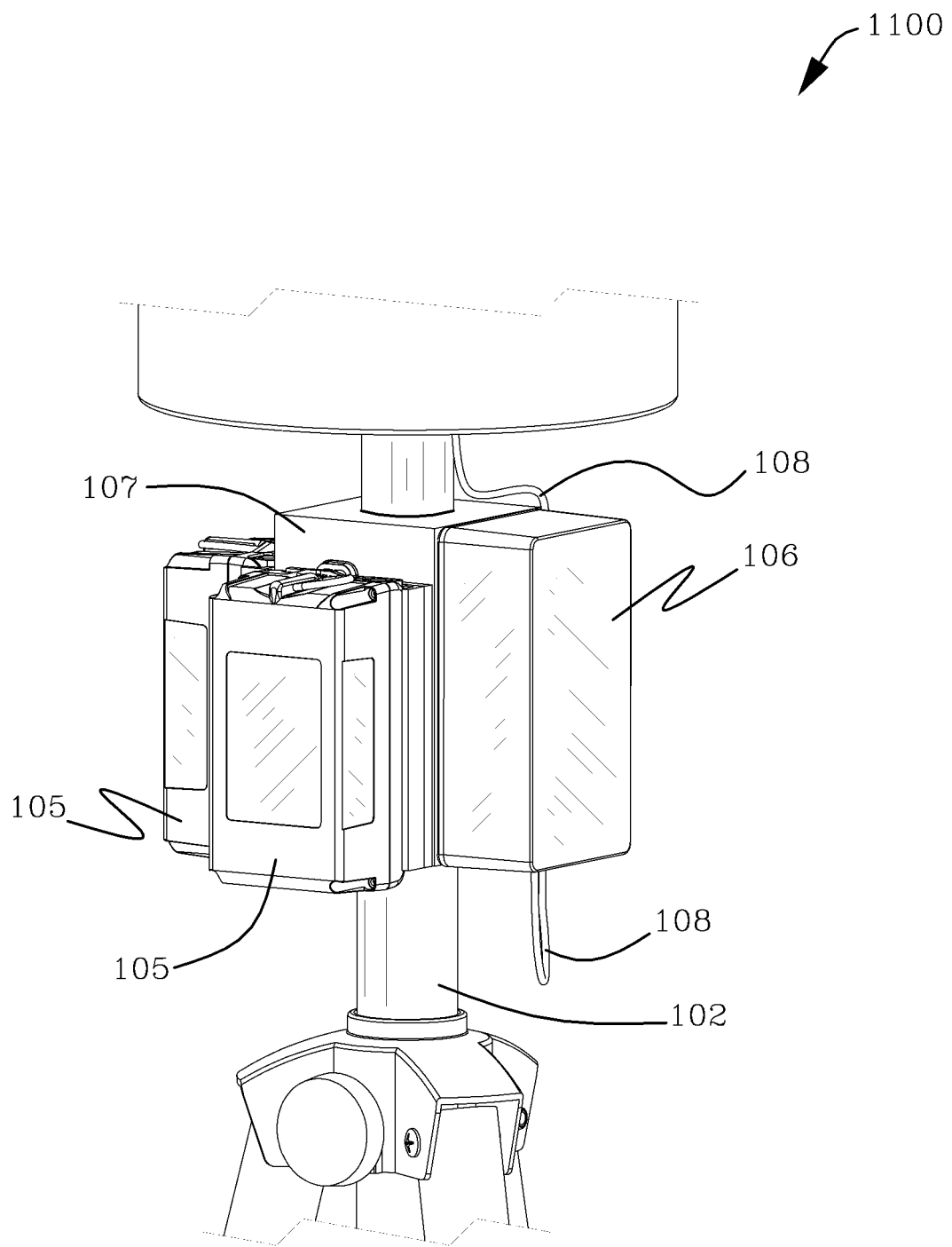
FIG. 11 is a view similar to FIG. 10.
Figure 12:
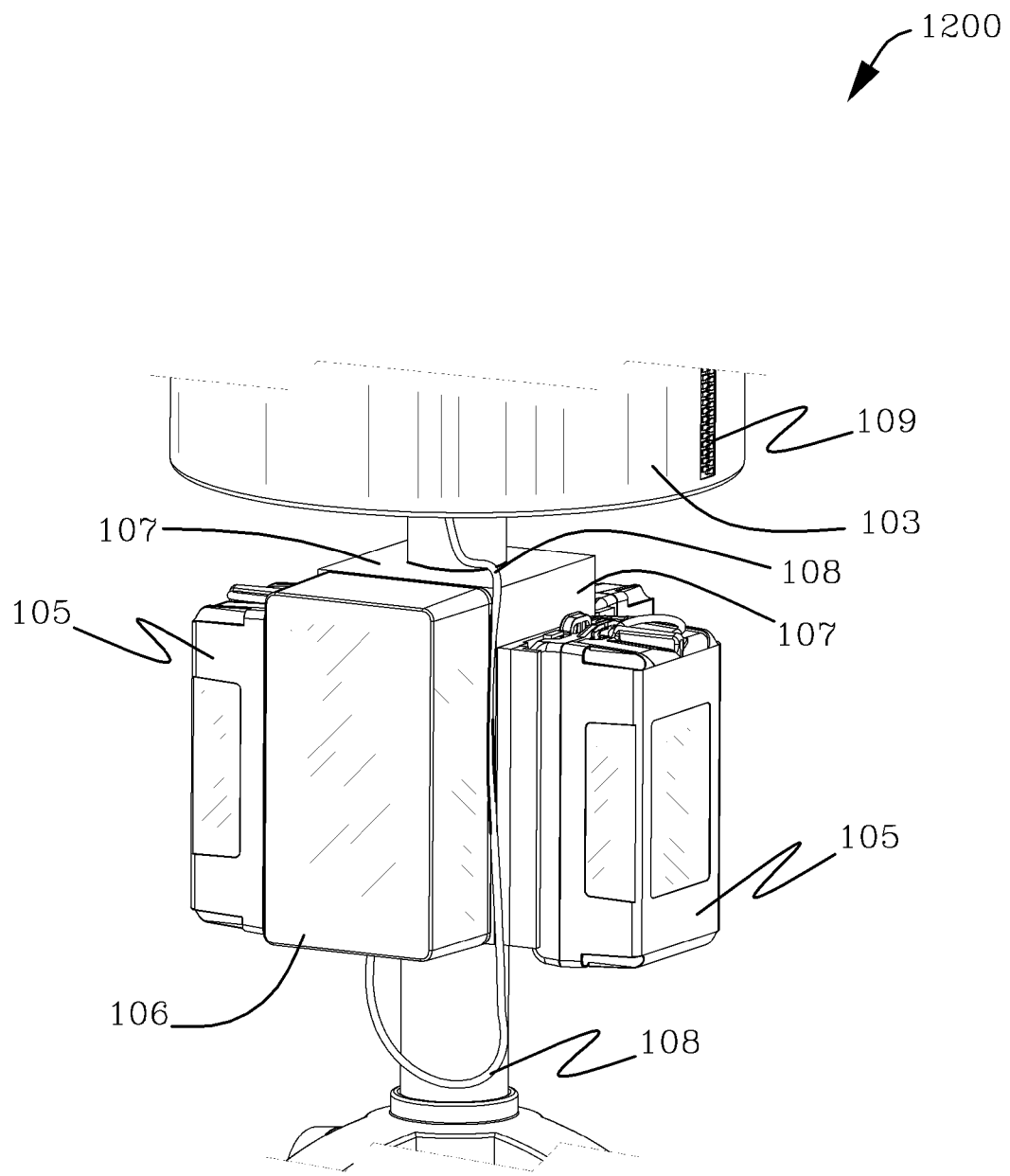
FIG. 12 is a view similar to FIG. 10.

FIG. 10 is a top perspective view 1000 of the batteries and the converter affixed to the mount which in turn is fastened to the post. Wiring 111 between the batteries and the converter and the camera is illustrated in FIG. 10. FIG. 11 is a view similar 1100 to FIG. 10. FIG. 12 is a view 1200 similar to FIG. 10.

Figure 13:
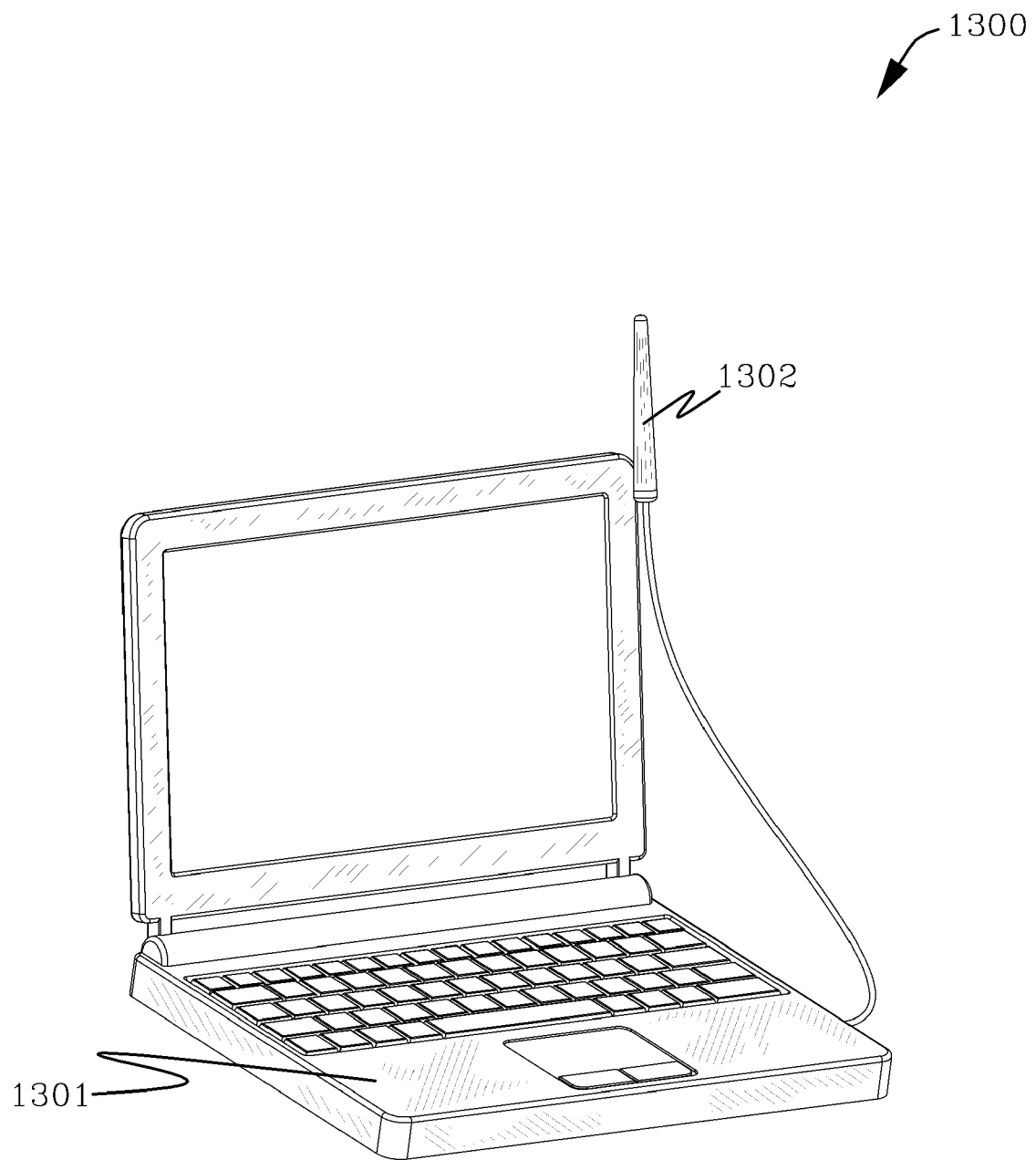
FIG. 13 is a perspective view of a computer which may wirelessly communicate with the camera.
Figure 14:
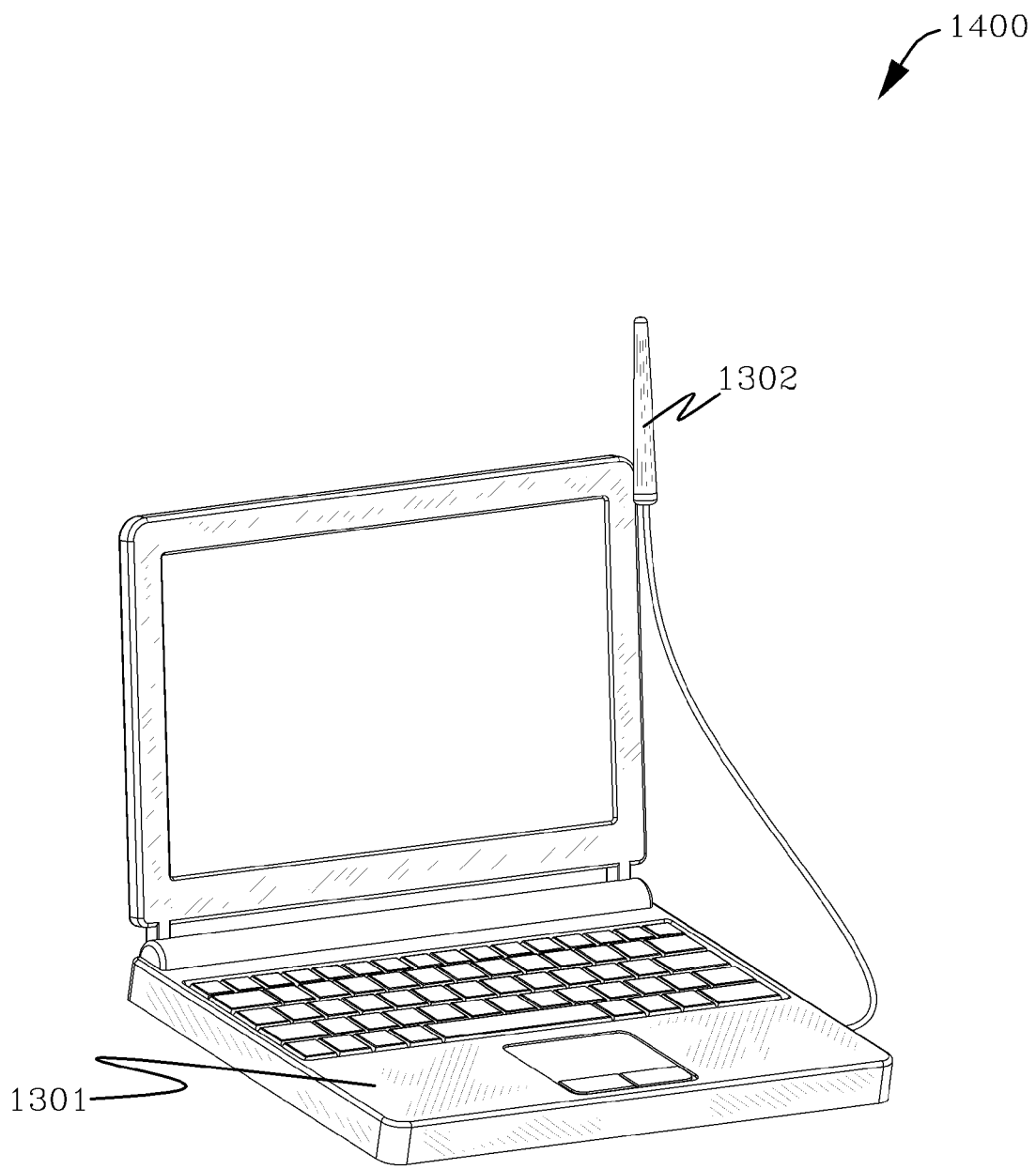
FIG. 14 is an enlarged view of FIG. 13.

FIG. 13 is a perspective view 1300 of a computer 1301 which may wirelessly communicate via antenna 1302 with the camera. FIG. 14 is an enlarged view 1400 of FIG. 13.

It should be noted that many different types of cameras along with different types of equipment auxiliary to camera operation may be included in the apparatus and powered by the lightweight power subsystem. A preferred embodiment includes a color video camera with remote controlled zoom lens, remote controlled pan and tilt articulation, an audio microphone input, controllable via a wireless IP network with video and audio data delivery via the same wireless IP network. Useful auxiliary equipment might include various illuminators such as infrared LED or other lamp type illuminators that may facilitate dark environment or nighttime video surveillance. The camera may be of a dual sensor type with one sensor optimized for daylight conditions (typically the color sensor) and the other optimized for low light conditions (typically a monochrome sensor). The camera may detect lighting conditions and automatically switch between sensors as indicated. A computer being used to control the camera and monitor the video and audio feeds via the wireless network may detect whether the camera is operating in daylight or nighttime modes and may also be used to switchably enable the aforementioned illuminator system when needed for nighttime operation. When not needed, the user may disable the illuminator system via computer command thus conserving power until it becomes needed once again.

A wired network system may also be used for conveying control information and/or transmitting video, audio, or other data between the computer and the camera subsystems. Network protocols other than IP are considered equally applicable as well.

Various types of camera systems are part of this invention including fixed cameras, cameras using large, high-resolution detectors with wide angle optics, high speed cameras useful for capturing high speed phenomena of any type, still picture cameras, cameras sensitive to wavelengths such as infrared, visible, and ultraviolet light, and any other photographic or video capture device including those applicable for medical, industrial, military, or other imaging which may be adapted for use with the portable power and wireless network systems described above.

Those skilled in the art will readily recognize that the invention has been set forth by way of example only and that changes and modifications thereto are contemplated without departing from the spirit and scope of the appended claims.

I claim:

1. A portable video camera system, comprising:
a video camera;
said video camera includes a video camera controller;
said video camera includes wireless communication means;
a first mount and a second mount;
a shaft, said shaft supports said video camera;
said first and second mounts are affixed to said shaft and said first and second mounts are supported by said shaft;
a light-weight quick-disconnect modular power supply removably affixed to said first mount;
a power conversion and control module removably affixed to said second mount;
said power conversion and control module includes wireless controller means for monitoring said light-weight quick-disconnect modular power supply;
said light-weight quick-disconnect modular power supply electrically communicating with said power conversion and control module;
said power conversion and control module electrically communicating with said video camera;
said video camera articulates three dimensional tilting, zooming, and panning;
a remote controller;
said remote controller includes a wireless communication system integral with said remote controller, said wireless remote controller communicating with said wireless video camera controller and said wireless controller of said power conversion and control module, said communication between said wireless remote controller, said wireless video camera controller, and said wireless controller of said power conversion and control module, occurring over an IP wireless network;
said remote controller, wirelessly, by said IP network, positioning and articulating said video camera by tilting, zooming and panning said video camera;
said wireless remote controller managing said power conversion and control module and the supply of power to said video camera;
said wireless remote controller sends command information to said video camera controller wirelessly over said IP network; and,
said command information includes pan, tilt, zoom, turn on-off, and set color mode.

2. A portable video camera system as claimed in claim 1 wherein said light-weight quick-disconnect modular power supply is a battery.

3. A portable video camera system as claimed in claim 1 wherein said first mount includes first and second male electrical contacts and said modular power supply includes first and second female electrical receptacles, and said first and second male electrical contacts engage said first and second female electrical receptacles.

4. A portable video camera system as claimed in claim 2 wherein said battery is a lithium ion battery.

5. A portable video camera system as claimed in claim 3 wherein said modular power supply is a lithium ion battery.

6. A portable video camera system as claimed in claim 1 further comprising a shroud for covering said tight-weight quick-disconnect modular power supply and said power conversion and control module to protect same from undesirable atmospheric conditions.

7. A portable video camera system as claimed in claim 2 further comprising a plurality of hot-swappable batteries having different battery chemistries removably coupled to a plurality of first mounts.

8. A portable video camera system as claimed in claim 1 further comprising a plurality of hot-swappable modular power supplies a d said plurality of modular power supplies have different voltages.

9. A portable video camera system as claimed in claim 1 wherein said camera controller transmits information regarding the status of said video camera to said remote controller wirelessly over said IP network.

10. A portable video camera system as claimed in claim 1 wherein said camera controller transmits media information from said video camera to said remote controller wirelessly over said IP network.

11. A portable video camera system as claimed in claim 10 wherein said media information is video information.

12. A portable video camera system as claimed in claim 10 wherein said media information is audio information.

13. A portable video camera system as claimed in claim 1 wherein said shaft includes a first portion and a second portion, said second portion of said shaft being separable from said first portion; said second portion of said shaft includes said first and second mounts a d said video camera; and, said second portion of said shaft adapted to be secured in the ground.

14. A portable video camera system, comprising:
a video camera;
said video camera includes a video camera controller;
said video camera includes communication means;
a first mount and a second mount;
a shaft, said shaft supports said video camera;
said first and second mounts are affixed to said shaft and said first am second mounts are supported by said shaft;
a light-weight quick-disconnect modular power supply removably affixed to said first mount;
a power conversion and control module removably affixed to said second mount;
said power conversion and control module includes a controller means for monitoring said light-weight quick-disconnect modular power supply;

said light-weight quick-disconnect modular power supply electrically communicating with said power conversion and control module;

said power conversion and control module electrically communicating with said video camera;

said video camera articulates three dimensional tilting, zooming, and panning;

a remote controller;

said remote controller includes a communication system integral with said remote controller, said remote controller communicating with said video camera controller and said controller of said power conversion and control module, said communication between said remote controller, said video camera controller, and said controller of said power conversion and control module, occurring over an IP network;

said remote controller, by said IP network, positioning and articulating said video camera by tilting, zooming and panning said video camera;

said remote controller managing said power conversion and control module and the supply of power to said video camera;

said remote controller sends command information to said video camera controller over said IP network; and, said command information includes pan, tilt, zoom, turn on-off, and set color mode.

* * * * *